United States Patent [19]

Johnson et al.

[11] 4,221,688
[45] Sep. 9, 1980

[54] SILICONE EMULSION WHICH PROVIDES AN ELASTOMERIC PRODUCT AND METHODS FOR PREPARATION

[75] Inventors: Robert D. Johnson, Lincoln Township, Midland County; John C. Saam; Christine M. Schmidt, both of Midland, all of Mich.

[73] Assignee: Dow Corning Corporation, Midland, Mich.

[21] Appl. No.: 901,052

[22] Filed: Apr. 28, 1978

[51] Int. Cl.$^2$ .............................................. C08L 83/04
[52] U.S. Cl. ...................... 260/29.2 M; 260/29.6 PM; 260/42.26; 260/42.54; 525/119; 528/18
[58] Field of Search ...................... 260/29.2 M, 42.26; 528/18

[56] References Cited

U.S. PATENT DOCUMENTS

| | | | |
|---|---|---|---|
| 2,881,146 | 4/1959 | Remer et al. | 260/29.2 M |
| 2,891,920 | 6/1959 | Hyde et al. | 260/29.2 M |
| 3,294,725 | 12/1960 | Findlay et al. | 260/29.2 M |
| 3,355,406 | 11/1967 | Cekada | 260/29.2 M |
| 3,423,340 | 1/1969 | Marshall et al. | 260/29.2 M |
| 3,696,127 | 10/1972 | Matherly | 260/29.2 M |
| 3,706,695 | 12/1972 | Huebner et al. | 260/29.2 M |
| 3,817,894 | 6/1974 | Butler et al. | 260/29.2 M |

*Primary Examiner*—J. Ziegler
*Attorney, Agent, or Firm*—James E. Bittell; Roger H. Borrousch

[57] ABSTRACT

A silicone emulsion having a dispersed phase of an anionically stabilized hydroxylated polydiorganosiloxane and a colloidal silica and a continuous phase of water in which the pH is 9 to 11.5 provides an elastomeric product, such as a film or coating, upon removal of the water at ambient conditions. The silicone emulsion can be prepared by adding the colloidal silica to the hydroxylated polydiorganosiloxane in an emulsified state and thereafter adjusting the pH within the range of 9 to 11.5 inclusive with such materials as an organic amine or sodium hydroxide. These emulsions are stable during storage over extended periods of time and will provide elastomeric products. A silicone emulsion can also be prepared as described except the pH is adjusted above 11.5.

35 Claims, No Drawings

SILICONE EMULSION WHICH PROVIDES AN ELASTOMERIC PRODUCT AND METHODS FOR PREPARATION

BACKGROUND OF THE INVENTION

1. Field of the Invention

This invention relates to a silicon emulsion which provides an elastomeric product and to methods of preparation.

2. Description of the Prior Art

Emulsions of organopolysiloxanes have been known for many years such as described by Hyde et al. in U.S. Pat. No. 2,891,920 issued in 1959. Hyde et al. considered one of the problems in the organosilicon field was the lack of a good method of preparing stable emulsions of extremely high molecular weight siloxanes having a molecular weight at least high enough to make suitable protective coatings. Although Hyde et al. described a concept for preparing on a commercial scale emulsion of siloxane suitable for protective coating, there are few products available today in the field of emulsions of siloxanes for protective coatings. The primary contribution of Hyde et al. appears to have been a method of polymerizing siloxanes in the emulsified state with strong mineral acids or strong alkaline catalysts which are characterized by their ability to rearrange siloxane bonds. Hyde et al. describe that the emulsion polymerization can be carried out with cationic, nonionic or anionic type dispersing agents, and that it is best to use anionic emulsifying agents for acid catalysts, cationic emulsifying agents for alkaline catalysts and nonionic emulsifying agents can be used for either acid or alkaline catalysts. The emulsions prepared by Hyde et al. are described as extremely stable in that they can stand for years without separation, and can also be centrifuged or diluted without separation. Hyde et al. also teach that the emulsion can be changed from one type of surfactant system to another after or during polymerization, such as from cationic to anionic or nonionic or vice versa, that anionic systems provide better surface wetting. Hyde et al. describe their emulsions as useful for release agents and coating compositions. The emulsions are also described as particularly adaptable for the preparation of latex paints, for example, they can be mixed with pigment or other fillers, applied to a surface where the water will evaporate leaving a continuous coating. Although Hyde et al. teach stability and continuous coating formation, they do not teach that stable emulsions can be obtained when additional materials are added such as the pigments and that continuous coatings can be obtained after storage or what the properties of such coatings will be.

Findlay et al. in U.S. Pat. No. 3,294,725 describe a method for polymerizing organosiloxanes in emulsion using a surface active sulfonic acid catalyst. Findlay et al. describe this method as a method for preparing stable organopolysiloxane latex emulsions. According to Findlay et al., the resulting emulsion can be neutralized to a pH near 7 with an alkaline material unless it is desired to remove the polysiloxane from the emulsion. Findlay et al. teach that alkali metal salts of the surface active sulfonic catalyst are useful when additional emulsifying agent is desired, particularly where silica fillers are to be used. The emulsions described by Findlay et al. are taught as having the same stability expressed by Hyde et al. and also as having the same utility. Findlay et al., however, teach that the emulsions either with or without the added filler are quite stable, and for maximum stability of the emulsion, it is desirable to neutralize the acid catalyst in the emulsion with a base to a pH of approximately 7. The neutralization of the acid catalyst can be done either prior to or after the addition of filler. Such systems are taught by Findlay et al. as providing an excellent method of obtaining coatings of tough rubbery siloxane films for release coatings. Findlay et al. describe tough rubbery films obtained from colloidal silica and neutralized emulsions made from polymerized hydroxylated dimethylpolysiloxane reacted with a trialkoxysilane such as methyltrimethoxysilane before emulsification. In one example, Findlay et al. added a colloidal silica sol which had a pH of 8.5.

Although Findlay et al. made stable emulsions of organosiloxanes, they apparently did not provide a silicone latex which would be stable on storage and from which a curable polymer could be deposited and which cured to give a tough elastomer because Cekada in U.S. Pat. No. 3,355,406 stated that there was still a need in the silicone industry for such a silicone latex. Cekada describes his latexes as useful for many applications including various coating applications. The silicone latexes described by Cekada are prepared from a colloidal suspension of a curable essentially linear silicon polymer in water using a suitable dispersing agent. To the polymer in the colloidal state, a silsesquioxane in the form of a colloidal suspension, preferably neutral, is added. Cross-linking agents and curing catalysts can be added. Those silicone latexes, according to Cekada, which contain no curing catalyst can be cured by exposing the deposited coating to a suitable radiation source. Cekada teaches that the curing catalysts can be mineral acids, strong bases, dialkyltin diacylates and organic and inorganic peroxides. The cross-linking agents taught by Cekada include alkoxysilanes and methylhydrogenpolysiloxanes. Although Cekada alleges a silicone latex which is stable on storage and from which a curable polymer can be deposited and cured to a tough elastomer, he offered no storage properties for his compositions. Cekada shows neutral latexes, except for one example in which the latex was acidic. In the present invention, a neutral emulsion is not stable on storage and does not cure to an elastomer after storage.

A caulk prepared from cationic emulsions of siloxane block copolymers is described by Butler et al. in U.S. Pat. No. 3,817,894. Butler et al. teach that six ingredients are required to prepare the caulk and that the emulsion of siloxane block polymer is neutralized to a pH of 7 for use in the caulk and that the caulk contain from 20 to 30 parts by weight of cationic surfactant per 300 to 600 parts by weight siloxane copolymer.

It is known in the silicone art that siloxane bonds rearrange in the presence of alkaline materials, particularly alkali metal hydroxides. Such siloxane bond rearrangement can be very useful in silicone manufacturing for the polymerization of polydiorganosiloxanes from cyclic polydiorganosiloxanes under carefully controlled conditions. However, it is also known that polydiorganosiloxanes under basic conditions in the presence of water can be converted to very low molecular weight species, including monomeric species. It was therefore unexpected that a stable emulsion could be prepared at high pH, stored and still produce an elastomeric coating or film after storage. Under conditions of a pH greater than 9, it would be expected that depolymerization would occur and result in water soluble species which would not give an elastomeric product when the water was removed. As taught by the prior art cited above, the storage stable emulsions are obtained when the emulsion or latex is adjusted to a pH near 7.

SUMMARY OF THE INVENTION

A silicone emulsion having a pH of 9 to 11.5 comprising a continuous aqueous phase and a dispersed phase of anionically stabilized hydroxylated polydiorganosiloxane and colloidal silica produces an elastomeric product when the water is removed under ambient conditions. This emulsion can contain a diorganotindicarboxylate, an amine, sodium hydroxide, other fillers, a thickener and an antifoam. These silicone emulsions can be prepared by emulsifying a hydroxylated polydiorganosiloxne using an anionic surfactant, adding colloidal silica and adjusting the pH in the range of 9 to 11.5. Silicone emulsions can also be prepared from anionically stabilized hydroxylated polydiorganosiloxane, silica and water wherein the pH is adjusted above 11.5. These silicone emulsions at this high pH are suitable for the preparation of elastomeric products if the water is removed from the emulsion within a relatively short period of time after preparation compared to those emulsions having a pH below 11.5.

DESCRIPTION OF THE INVENTION

This invention relates to a silicone emulsion suitable to provide an elastomeric product upon removal of the water under ambient conditions comprising a continuous aqueous phase and a dispersed phase, the aqueous phase comprises water and the dispersed phase comprises an anionically stabilized hydroxylated polydiorganosiloxane and a colloidal silica, said silicone emulsion having a pH in a range of 9 to 11.5 inclusive.

The hydroxylated polydiorganosiloxanes useful for this invention are those which can be emulsified and which will impart elastomeric properties to the product obtained after the removal of the water. The term "hydroxylated polydiorganosiloxane" for the purposes of this invention is understood to mean that the polymer is essentially a linear species of repeating diorganosiloxane units but also including polymeric species which contain small numbers of monoorganosiloxane units, up to a maximum of about one monoorganosiloxane unit per each 100 diorganosiloxane units. The hydroxylated polydiorganosiloxanes will therefore have an average of about two silicon-bonded hydroxyls per molecule up to a number of silicon-bonded hydroxyls which is equal to one silicon-bonded hydroxyl for each monoorganosiloxane in the hydroxylated polydiorganosiloxane molecule plus the two chain terminating silicon-bonded hydroxyls. The hydroxylated polydiorganosiloxanes are preferably those which contain about 2 silicon-bonded hydroxyls per molecule.

The hydroxylated polydiorganosiloxanes are those which impart elastomeric property to the product obtained after the removal of the water from the emulsion. Such hydroxylated polydiorganosiloxanes should have a weight average molecular weight ($\overline{M}w$) of at least 5,000. Hydroxylated polydiorganosiloxanes with low $\overline{M}w$ do not provide strong elastomeric products, but are useful for certain coating applications. Tensile strengths and elongations at break improve with increasing molecular weight, with reasonable tensile strengths and elongations obtained above 30,000 $\overline{M}w$ and the best tensile strengths and elongations obtained above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxylated polydiorganosiloxane are expected to be practical for this invention. The hydroxylated polydiorganosiloxanes at the higher weight average molecule weights preferably contain some monoorganosiloxane units to increase the silicon-bonded hydroxyl content. The preferred $\overline{M}w$ for the hydroxylated polydiorganosiloxanes are in the range of 200,000 to 700,000.

The organic radicals of the hydroxylated polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxylated polydiorganosiloxanes preferably contain organic radicals in which at least 50 percent are methyl. The preferred hydroxylated polydiorganosiloxnes are the hydroxylated polydimethylsiloxanes.

The most preferred hydroxylated polydiorganosiloxanes are those prepared by the method of anionic emulsion polymerization described by Findlay et al. in U.S. Pat. No. 3,294,725 which is hereby incorporated by reference to show the methods of polymerization and to show the hydroxylated polydiorganosiloxane in emulsion. Another method of preparing hydroxylated polydiorganosiloxane is described by Hyde et al. in U.S. Pat. No. 2,891,920 which is hereby incorporated by reference to show the hydroxylated polydiorganosiloxanes and their method of preparation. These methods and others are known in the art. The hydroxylated polydiorganosiloxnes of this invention are those which are anionically stabilized. For the purpose of this invention "anionically stabilized" means the hydroxylated polydiorganosiloxane is stabilized in emulsion with an anionic surfactant.

Anionic surfactants are preferably the salt of the surface active sulfonic acids used in the emulsion polymerization to form the hydroxylated polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids silylalkylsulfonic acids and aliphatically substituted diphenylethersulfonic acids.

One of the advantages of the present invention is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxylated polydiorganosiloxane. Other anionic emulsifying agents can be used, for example, alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate.

Although not specifically required in the present invention, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Colloidal silica is a required ingredient in this invention. Any of the colloidal silicas can be used. These colloidal silicas are well known in the art and many are commercially available. Although any of the colloidal silicas can be used including fume colloidal silicas and precipitated colloidal silicas, the preferred colloidal silicas are those which are available in an aqeuous medium. Colloidal silicas in an aqueous medium are usually available in a stabilized form, such as those stabilized with sodium ion, ammonia or an aluminum ion. Aqueous colloidal silicas which have been stabilized with sodium ion are particularly useful for this invention because the pH requirement can be met by using such a sodium ion stabilized colloidal silica without having to add additional ingredients to bring the pH within the range of 9 to 11.5. The term "colloidal silica" as used herein are those silicas which have particle diameters of from 0.0001 to 0.1 micrometers. Preferably, the particle diameters of the colloidal silicas are from 0.001 to 0.05 micrometers.

The silicone emulsion of this invention has a continuous water phase in which there is a dispersed phase which comprises an anionically stabilized hydroxylated polydiorganosiloxane and colloidal silica. For this silicone emulsion to maintain a storage stability and also be curable to an elastomer after the emulsion is stored, the pH of the silicone emulsion must be within the range of 9 to 11.5 inclusive. The silicone emulsions of this invention which have the best storage stability and still form elastomers at ambient conditions at any point during the storage stable period are those which have a pH in the range of 10.5 to 11.2.

These silicone emulsions which contain in the dispersed phase the hydroxylated polydiorganosiloxane and colloidal silica and have a pH in the range of 9 to 11.5 do not require additional ingredients to obtain an elastomeric product after the water is removed at ambient conditions. However, certain additional ingredients have been found useful in providing certain advantageous characteristics to the silicone emulsion and the elastomeric products obtained therefrom. For example, a thickener can be added to improve the handling characteristics of the silicone emulsion such as thixotropy and structural viscosity. The thickener is useful for increasing the working viscosity of the silicone emulsion to provide a material which can be used to coat a substrate with a film of elastomeric product. Such silicone emulsions with thickener permit the application of thicker coats which form thicker elastomeric films. The use of a thickener also permits a broader versatility of the silicone emulsion by allowing one to select the proper and most convenient emulsion consistency for the specific application. Suitable thickeners are available commercially and would be selected for their stability and usability, at pH of 9 and greater. Some of the useful thickeners include the classes of cellulose derivatives, alkali salts of polyacrylates and polymethylacrylates, sodium and ammonium salts of carboxylate copolymers and colloidal clays. These and other thickeners can be used but it is advised that a particular thickener be tried on a small scale to determine if it does not adversely effect the storage stability of the emulsion, the formation of the elastomeric product or the resulting properties of the elastomeric product. For the silicone emulsions of this invention, the best thickeners are the sodium salts of polyacrylates.

Another useful ingredient for addition to the silicone emulsions of this invention is a filler other than colloidal silica. Such fillers can be added to provide pigmentation which can be used, for example, as a colorant as in a paint or an ultraviolet light screening agent. Other fillers can be used as extending fillers which can be used to reduce the cost per unit of the elastomeric product or to make the silicone emulsion useful as a caulking material. Examples of some fillers other than colloidal silica include carbon blacks, titanium dioxide, clays, aluminum oxide, quartz, calcium carbonate, zinc oxide, mica and various colorant pigments. Titanium dioxide has been found to be particularly useful as an ultraviolet light screening agent. These fillers other than colloidal silica should be finely divided and it may be advantageous to use aqueous dispersions of such fillers if they are commercially obtainable such as aqueous dispersions of carbon black. However, the silicone emulsions of the present invention do not require that these fillers be added in the form of aqueous dispersions. The silicone emulsion readily accepts the finely divided fillers in the dry form.

The silicone emulsion of this invention can contain the required ingredients in a broad range of concentrations and find utility over the entire range. Some general ranges of components can be defined for specific applications. The amount of dispersed phase can be very low such as about one or two weight percent. Silicone emulsions which have from 1 to 20 weight percent dispersed phase based on the weight of the emulsion are useful for imparting a property such as water repellency to a substrate via a thin elastomeric film. Substrates such as textiles and paper can be provided with water repellency characteristics using these silicone emulsions. Silicone emulsions having a dispersed phase from 20 to 60 weight percent based on the weight of the emulsion are useful for coating applications such as roof coatings wherein thicker elastomeric films are desired. Silicone emulsions having a dispersed phase above 60 weight percent based on the weight of the emulsion are useful for applications such as for caulking. The aqueous phase can be present in amounts from about 99 weight percent based on the weight of the silicone emulsion down to the point at which the aqueous phase is no longer the continuous phase which is about 20 weight percent. The dispersed phase, therefore, can be present in amounts of from about 1 weight percent to about 80 weight percent based on the total weight of the silicone emulsion.

The dispersed phase requires hydroxylated polydiorganosiloxane and colloidal silica. In view of the required pH range of the silicone emulsion, the hydroxylated polydiorganosiloxane may not contain exclusively silicon-bonded hydroxyl radicals. Some of the hydrogen atoms of the silicon-bonded hydroxyl radicals may be replaced with an alkali metal ion, such as sodium ion, may be complexed with an amine or may be associated with an emulsifying agent. Thus, the term "hydroxylated polydiorganosiloxane" as used herein covers all the species of terminating groups which may be formed by emulsifying a hydroxylated polydiorganosiloxane at a pH of 9 to 11.5. The relative amounts of hydroxylated polydiorganosiloxane and colloidal silica can vary over a wide range, such as from 1 to 150 parts by weight of colloidal silica for each 100 parts by weight of hydroxylated polydiorganosiloxane. Amounts of colloidal silica from 1 to 10 parts by weight for each 100 parts by weight of hydroxylated pokydiorganosiloxane have been found to be particularly useful in silicone emulsions used for imparting water repellency to substrates. Amounts above 10 parts by weight for each 100 parts by weight of hydroxylated polydiorganosilopxane are particularly useful for coatings and caulks, wherein the preferred range is from 15 to 50 parts by weight colloidal silica for each 100 parts by weight of hydroxylated polydiorganosiloxane.

The best method of preparing the silicone emulsions is to emulsify a hydroxylated polydiorganosiloxane using an anionic surfactant, add the colloidal silica and then adjust the pH within the range of 9 to 11.5 inclusive. One of the best methods for emulsifying a hydroxylated polydiorganosiloxane is to prepare this siloxane polymer by emulsion polymerization as described in U.S. Pat. No. 3,294,725, starting with polydiorganocyclosiloxanes. This emulsion polymerization uses an anionic polymerization catalyst and thus the resulting hydroxylated polydiorganosiloxane contains an anionic surfactant and thus it is ready to be used to make the silicone emulsions of this invention. There are other methods of emulsifying a hydroxylated polydiorganosiloxane using an anionic surfactant, such as described in U.S. Pat. No. 2,891,920. Although these other methods can be used to emulsify a hydroxylated polydiorganosiloxane to provide an anionically stabilized siloxane polymer, they are less convenient inasmuch as additional steps are involved, as well as additional ingredients. The concentration of the hydroxylated polydiorganosiloxane in the anionically stabilized emulsion is not critical, however, for convenience, one should use a concentration which is in line with the concentration of the dispersed phase desired in the final silicone emulsion.

The colloidal silica can be added to the anionically stabilized hydroxylated polydiorganosiloxane in the form of a dry powder or as an aqueous dispersion. The best method is to add the colloidal silica in the form of a sodium ion stabilized aqueous dispersion of colloidal silica. There are many such sodium ion stabilized aqueous dispersions of colloidal silica which are commercially available. These commercial colloidal silicas are usually available in aqueous dispersions having from 15 to 30 weight percent colloidal silica and having a pH in the range of 8.5 to 10.5

After the colloidal silica is added, the pH is adjusted within the range of 9 to 11.5. Silicone emulsions, as described herein, are not storage stable or do not form an elastomeric product over the entire storage period if the pH is adjusted below 9. The resulting silicone emulsion does not provide a useful elastomeric product when the water is allowed to evaporate at ambient conditions immediately after the emulsion is prepared.

However, if this silicone emulsion is stored at room temperature, an elastomeric product can be obtained by removal of the water at room temperature after extended storage periods, such as five months. Such a phenomenon is not understood, but these stored silicone emulsions do provide very desirable elastomeric products. It is commerically undesirable to store the emulsions for such long periods. It has been found that the addition of an organic tin compound, preferably a diorganotindicarboxylate, can be used to reduce the storage time between the preparation of the silicone emulsion and the time an elastomeric product can be obtained from the silicone emulsion by removal of the water under ambient conditions to an acceptable range of one to three days. Such storage times are well within the time required to package and distribute a commercial product. Diorganotindicarboxylate can be used in amounts of from 0.1 to 2 parts by weight for each 100 parts by weight of the hydroxylated polydiorganosiloxane, preferably about 0.5 to 1.5 parts by weight for each 100 parts by weight of hydroxylated polydiorganosiloxane. Diorganotindicarboxylates include dibutyltindiacetate, dibutyltindilaurate and dioctyltindilaurate. The preferred diorganotindicarboxylate is dioctyltindilaurate.

The pH of the silicone emulsion prepared as described herein can be adjusted within the defined range by any of a number of methods, such as with a basic compound or an ion exchange means, such as an ion exchange resin. The best methods have been found to be with a basic compound, such as an organic amine, an alkali metal hydroxide or a combination thereof. The organic amines can be primary, secondary or tertiary amines which contain carbon, hydrogen and nitrogen, and can also contain oxygen, and which are water soluble in the amounts requires. These organic amines include diethylamine, ethylenediamine, butylamine, hexylamine, morpholine, monoethanolamine, triethylamine and triethanolamine. The preferred organic amine for maximum storage stability is diethylamine. The alkali metal hydroxides include sodium hydroxide, potassium hydroxide, lithium hydroxide, rubidium hydroxide and cesium hydroxide. The preferred alkali metal hydroxide is sodium hydroxide. The organic amines can be added neat or in aqueous solution. The alkali metal hydroxides are perferably added as an aqueous solution. A combination of diethylamine and sodium hydroxide have been found to be particularly suitable to provide long term storage stability for these silicone emulsions, maintaining the useful elastomeric forming ability, and maintaining useful elastomeric properties in the product obtained after removal of the water at ambient conditions.

With the proper selection of anionically stabilized hydroxylated polydiorganosiloxane and colloidal silica, the mixing of these two ingredients can automatically adjust the pH within the required range and an additional step of adjusting the pH is not needed. Thus, the mixing of the siloxane and colloidal silica encompasses the step of adjusting the pH. The selection of a hydroxylated polydiorganosiloxane which has a pH of at least 9 and an aqueous dispersion of a colloidal silica which has a pH of at least 9 can provide a silicone emulsion with the scope of this invention without further necessity of adjusting the pH by adding additional ingredients. An aqueous dispersion of a colloidal silica which is sodium ion stabilized is preferably used as the colloidal silica with a pH above 9. It is not necessary that both the siloxane and colloidal silica have a pH above 9, but the resulting combination would be required to have pH in the range of 9 to 11.5, if not, adjusting the pH would be required as state above. To obtain the preferred pH range of 10.5 to 11.2, it will usually require adjusting the pH after the siloxane polymer and colloidal silica are mixed. For the purpose of this invention, the term "pH" means the electrical potential measured on commercially available glass electrodes designed for this purpose when the glass electrode is immersed in the emulsion. The electrical potential is read from a scale on a commercial instrument in terms of the negative $\log_{10}$ of hydrogen ion activity. The electrode is calibrated with a standard buffer solution which gives a pH of 10.

In the method of preparing the silicone emulsion as described above, frothing can be encountered. It is therefore advantageous to add an antifoaming agent (an antifoam) to control such frothing. A preferred class of antifoams are those based on silicones which are available commercially.

The silicone emulsions as defined above for coating applications are particularly suitable for coating polyurethane foam used on roofs. The coating is elastomeric, forms at ambient temperatures as low as 4° C., does not evolve organic solvents which can be irritating to the applicator as well as environmentally unsuitable, and are tough enough to provide satisfactory protection to the polyurethane. The silicone emulsions which are best suited for roof coatings are those which contain titanium dioxide as an ultraviolet screening agent which protects the polyurethane foam from the harmful effects of ultraviolet light.

Some additional advantages of these silicone emulsions are that relatively small amounts of emulsifying agents are required to maintain stability and as a result the elastomeric product is not loaded with large amounts of unreacted ingredients which can evolve from the elastomeric product, such as blooming, or reduce the strength of the elastomeric product, that the elastomeric product forms without curing catalysts or the application of heat or radiation, and that the silicone emulsion can be used for many different purposes by changing the concentrations of the colloidal silica and the dispersed phase. It was unexpected that a silicone emulsion could produce under ambient conditions an elastomeric product with strong elastic properties from a medium which had such a high pH and still be storage stable over periods of up to one year or more. Practical silicone emulsions of this invention would be storage stable for at least six months at ambient temperatures.

These silicone emulsions can form elastomeric products by removal of the water under ambient conditions. When the silicone emulsion is spread out to form a coating, the water evaporates to leave a cured silicone elastomer. Silicone emulsion coatings can skin over in about 15 minutes becoming tack free in about one hour and obtaining substantial physical properties in one day and maximum properties in a few days. The curing characteristics can take place in shorter time periods depending upon the film thickness and method of application. It is also expected that heating the silicone emulsions can produce the elastomeric products. It should be understood that this invention is not limited to removal by evaporation of water, other methods of coagulation may be useful.

It has also been found that silicone emulsions can be obtained by adjusting the pH of the above defined combination of hydroxylated polydiorganosiloxane and colloidal silica above 11.5. Similar silicone emulsions and elastomeric products compared to those described above are obtained, however, such silicone emulsions do not have the long term storage stability with respect to the property of forming useful elastomeric products after long storage periods. These silicone emulsions which have their pH adjusted above 11.5 should be used within a short time such as within two weeks from the time of preparation to obtain good elastomeric products upon removal of the water at ambient temperature.

The following examples are presented for purposes of illustrating the invention and should not be construed as limiting the scope of the invention which is properly delineated in the claims.

EXAMPLE 1

A silicone emulsion was prepared by adding 100 parts by weight of an aqueous sodium ion stabilized colloidal silica having about 30 weight percent $SiO_2$, having a specific gravity of 1.21 and having a pH at 25° C. of about 10 (hereinafter referred to as Colloidal Silica A) to 200 parts by weight of an aqueous emulsion containing about 50 weight percent of an emulsion polymerized hydroxyl endblocked polydimethylsiloxane having a weight average molecular weight of about 325,000 (hereinafter referred to as Polymer Emulsion A). The aqueous emulsion of the polydimethylsiloxane was anionically stabilized with the sodium salt of dodecylbenzenesulfonic acid which was present in an amount of about one weight percent based on the weight of the emulsion. To the silica and polydimethylsiloxane emulsion, there was added 2 parts by weight of an emulsion containing 50 weight percent dioctyltindilaurate, 9 weight percent of a sodium alkylarylpolyether sulfonate and 41 weight percent water (hereinafter referred to as Tin Emulsion A), the tin emulsion accelerated an aging process of the silicone emulsion. To the tin-containing silicone emulsion, there was added 0.5 part by weight morpholine and a sufficient amount of a commercial polyacrylate thickener to result in an emulsion viscosity at 25° C. of about 0.5 Pa.s (pascal-seconds) as determined by a Brookfield viscometer using a No. 3 spindle at 2 rpm. The resulting silicone emulsion contained about 43 weight percent dispersed phase and had a pH of about 10.0. Films were prepared from this silicone emulsion by spreading silicone emulsion and allowing the water to evaporate at room temperature. The resulting films had thicknesses of 0.381 to 0.762 millimeters. The films were elastomeric and had tensile strengths at break of 2758 to 4137 kPa (kilopascals)(400 to 600 psi), elongations at break of 600 to 800 percent, a modulus at 100 percent elongation of about 1034 kPa and tear strengths of 14,010 to 21,015 N/m (Newtons per meter).

EXAMPLE 2

Silicone emulsions were prepared to show the effect of aging and the acceleration of aging by the use of a diorganotindicarboxylate. The hydroxylated polydimethylsiloxane used in these preparations had a peak molecular weight of about 350,000 and was in the form of an aqueous anionically stabilized emulsion which contained 52 weight percent hydroxylated polydimethylsiloxane, 0.4 weight percent dodecylbenzenesulfonic acid, 0.5 weight percent morpholine, 0.6 weight percent sodium laurylsulfate and the remainder water. This aqueous anionically stabilized emulsion of hydroxylated polydimethylsiloxane had a pH greater than 8 and will be hereinafter referred to as Polymer Emulsion B.

A. An emulsion was prepared by mixing 192.0 parts by weight of Polymer Emulsion B, 100.0 parts by weight of Colloidal Silica A and 1 part by weight morpholine. This emulsion which had a pH between 9 and 10 was placed in a closed container and stored at room temperature. Samples of this stored emulsion were removed periodically from the container and spread out to determine if the emulsion would cure to an elastomeric film by allowing the water to evaporate at room temperature. Samples of the stored emulsion removed after 24 hours, 48 hours and 72 hours would not cure, however, a sample removed after 5 months cured to a tough elastomeric film.

B. An emulsion was prepared by mixing 192.0 parts by weight of Polymer Emulsion B, 1.0 part by weight Tin Emulsion A and 1 part by weight of morpholine. This emulsion was placed in a closed container and stored at room temperature. Samples were removed from the container and checked for cure as described in A. above. No cure was observed after any of the storage periods, even after 5 months.

C. An emulsion was prepared by mixing 192.0 parts by weight of Polymer Emulsion B, 100 parts by weight of Colloidal Silica A. 1.0 part by weight of Tin Emulsion A and 1 part by weight of morpholine. This emulsion was placed in a closed container and stored at room temperature. Samples were removed from the container and checked for cure as described in A. above. No cure was observed after 24 hours storage. After 48 hours storage, the emulsion resulted in a very punky film which had definitely crosslinked. After 72 hours storage and 5 months storage, the emulsion cured to a tough elastomeric film.

D. After storing an emulsion prepared as described in A. above for 74 hours, 1.0 part by weight of Tin Emulsion A was added. The room temperature storage was continued and samples of emulsion were removed after an additional 24 hours, 48 hours and 72 hours. These samples were spread out to determine if an elastomeric film would be obtained by allowing the water to evaporate at room temperature. The results were the same as in C. above, no cure after storage for 24 hours, a very punky film after storage for 48 hours and a cured tough elastomeric film after storage for 72 hours.

E. After storing an emulsion prepared as described in B. above for 72 hours, 100 parts by weight of Colloidal Silica A was added. The room temperature storage was continued and samples were removed after an additional 24 hours, 48 hours and 72 hours. The curing properties were the same as described in D. above.

EXAMPLE 3

An emulsion suitable for use as a roof coating was prepared by adding to 192.0 parts by weight of Polymer Emulsion B, 100.0 parts by weight of a sodium ion stabilized aqueous colloidal silica having 15 weight percent $SiO_2$, having a particle size of about 0.004 micrometers and having a pH of about 10 (hereinafter referred to as Colloidal Silica B), 1.0 part by weight of morpholine, 0.3 part by weight of a mixture of 70 weight percent water and 30 weight percent sodium laurylsulfate, 20.0 parts by weight finely divided titanium dioxide as an ultraviolet screening agent, 1.0 part by weight of Tin Emulsion A and 1.5 parts by weight of a polyacrylate thickener. The resulting emulsion had a viscosity at 25° C. of 18.5 Pa.s as determined by a Brookfield viscometer using a No. 3 spindle at 2 rpm and a pH between 10.5 and 11.2. An elastomeric film obtained from spreading the emulsion and allowing the water to evaporate at room temperature had a tensile strength at break of 3447 kPa, an elongation of 600 percent and a tear strength of 17,513 N/m. This elastomeric film was painted with an oil base paint and a latex base paint. The oil base paint gave 70 percent paint retention and the latex base paint gave 100 percent paint retention.

EXAMPLE 4

An emulsion was prepared by adding 20 g. of a colloidal fume silica having a surface area of 220 $m^2/g$ in small increments to 0.0002 $m^3$ of Polymer Emulsion A. During the addition of the fume silica, the emulsion was vigorously stirred in a Waring blender and the pH was maintained within the range of 9 to 10. After the fume silica was added, 0.000001 $m^3$ of an emulsion of 20 weight percent stannous octoate in water was added to 0.0001 $m^3$ of the emulsion. After 2 days, the emulsion was used to cast a film. After the water evaporated at room temperature, a strong, tough elastomeric film was obtained. Preparing an emulsion similar to the one described above and using a colloidal precipitated silica gave similar results.

EXAMPLE 5

Emulsions were prepared using emulsion polymerized hydroxyl endblocked polydimethylsiloxanes of varying molecular weight. These siloxane polymers were anionically stabilized with sodium laurylsulfate and had pH's above 9. The molecular weights as shown in Table I were determined by gel permeation chromatography and are weight average molecular weights ($\overline{Mw}$). The emulsions were prepared by mixing 50 parts by weight of each siloxane polymer emulsion having from 47 to 50 weight percent polymer, 25 parts by weight of Colloidal Silica B and 0.25 part by weight of Tin Emulsion A. The pH value for each emulsion was greater than 9.9. Films were cast by spreading the emulsion and allowing the water to evaporate at room temperature. Physical properties were determined on three samples of each elastomeric film and the values shown in Table I are the average of the three samples. The average deviation for the tensile strength was 9.3 percent, for the elongation it was 7.4 percent and for the modulus at 100 percent elongation was 7.1 percent.

TABLE I

| Mw | Tensile Strength, kPa | Elongation % | Modulus, kPa |
|---|---|---|---|
| 56,500 | 1424 | 310 | 814 |
| 112,000 | 2682 | 473 | 800 |
| 152,000 | 2696 | 470 | 910 |
| 191,000 | 2682 | 530 | 903 |
| 251,000 | 2696 | 637 | 772 |
| 263,000 | 3268 | 613 | 883 |
| 285,000 | 3041 | 667 | 876 |

EXAMPLE 6

Six hundred grams of an anionically stabilized emulsion containing 46 percent by weight of hydroxyl endblocked polydimethylsiloxane having a molecular weight above 200,000 was mixed with 300 g. of Colloidal Silica B, 2.0 g. of Tin Emulsion A. The resulting emulsion had a pH of 10.4. To determine the pH value at which cured elastomeric products could be formed, portions of the emulsion were mixed with a quantity of a strong acid ion exchange resin untl the pH reached the values shown in Table II. After the desired pH value was reached, the emulsion was decanted from the ion exchange resin and then stored at room temperature. Periodically the stability of the emulsions were observed and films were cast to determine if cured elastomers were obtainable. The results were as shown in Table II. In Table II, "Original pH" refers to the pH of the emulsion after decanted from the ion exchange resin, "Cast pH" refers to the pH of the emulsion at the time the film was layed out, "Days Stable" refers to the number of days before the emulsion gelled, and "Day for Cure to Develop" refers to the number of days the emulsion was stored after the pH was originally adjusted before a cast film would cure to an elastomeric product.

TABLE II

| Original pH | Cast pH | Days Stable | Days For Cure To Develop |
|---|---|---|---|
| 10.4 | 10.4 | >39 | 1.7 |
| 9.2 | 9.8 | 39 | 2.7 |
| 8.4 | 9.6 | 10 | 7.0 |
| 7.0 | 8.2 | 7 | No Cure |
| 3.4 | 4.6 | 10 | No Cure |

EXAMPLE 7

A series of silicone emulsions were prepared by mixing 200 parts by weight of an emulsion of an anionically stabilized emulsion polymerized hydroxyl endblocked polydimethylsiloxane having a weight average molecular weight of about 350,000, X parts by weight of Colloidal Silica A where X is defined in Table III, 1.0 part by weight of Tin Emulsion A, and 10.0 parts by weight of a polyacrylate thickener. The physical properties were determined and were as shown in Table III.

TABLE III

| X | Parts By Weight Silica | Tensile Strength, kPa | Elongation, % | Tear Strength, N/m | Modulus at 100% Elongation, kPa |
|---|---|---|---|---|---|
| 66.7 | 20 | 2,206 | 800 | 6,655 | 207 |
| 100 | 30 | 3,241 | 800 | 15,236 | 827 |
| 133.3 | 40 | 4,137 | 720 | 16,987 | 2,068 |
| 166.7 | 50 | 2,689 | 350 | 21,365 | 2,413 |

EXAMPLE 8

A series of silicone emulsions were prepared to show the effect of various organic amines. These silicone emulsions were prepared by mixing 166.7 parts by weight of an emulsion having a pH of about 3 and containing about 60 weight percent of hydroxyl endblocked polydimethylsiloxane having a weight average molecular weight of about 325,000, 1.14 part by weight sodium laurylsulfate, 0.8 part by weight dodecylbenzenesulfonic acid and the remainder water (hereinafter referred to as Polymer Emulsion C); 20.0 parts by weight of titanium dioxide; 7.0 parts by weight of a polyacrylate thickener; 15.0 part by weight Colloidal Silica B; 1.0 part by weight of Tin Emulsion A; and sufficient organic amine to provide 0.012 mole or 0.024 mole in the emulsion. The silicone emulsions were then stored at 50° C. for the purpose of providing accelerated storage properties. For the purpose of this test, one week at 50° C. was considered to be equivalent to about 6 months at room temperature and 2 weeks at 50° C. was considered to be equivalent to one year. It should be understood, however, that actual room temperature storage properties of the silicone emulsions may be different than those suggested by the 50° C. accelerated storage test. Silicone emulsions as prepared above containing the following organic amines gelled in one week at 50° C.: butylamine, hexylamine, morpholine, monoethanolamine, triethylamine and triethanolamine. Silicone emulsions as prepared above containing ethylenediamine at 0.012 mole gelled after one week at 50° C. and at 0.024 mole did not cure after storage for one week at 50° C. Silicone emulsions prepared as described above containing 0.012 mole of diethylamine started to thicken after 10 days of storage at 50° C. and the emulsion, when cast, cured to an elastomeric product after storage, at 0.024 mole the viscosity of the emulsion was stable for at least 4 weeks at 50° C. and the emulsion, when cast, cured to elastomeric products over the 4 week storage period.

EXAMPLE 9

A number of series of silicone emulsions were prepared to observe the pH effects.

A. This series was prepared by mixing 166.7 parts by weight of Polymer Emulsion C, 50 parts by weight of an aqueous dispersion having a pH of 10 and containing 30 weight percent sodium ion stabilized colloidal silica which had a surface area of 400 m$^2$/g (hereinafter referred to as Colloidal Silica C), X parts by weight of an aqueous solution containing 30 weight percent sodium hydroxide (X is defined in Table IV), 20 parts by weight of titanium dioxide, 1 part by weight of Tin Emulsion A and 7 parts by weight of a polyacrylate thickener.

B. This series of silicone emulsions was prepared by mixing the ingredients defined in A. and adding 1.752 parts by weight diethylamine.

C. This series of silicone emulsions was prepared by mixing the ingredients defined in A. and adding 2.088 part by weight of morpholine.

D. This series of silicone emulsions was prepared by mixing the ingredients defined in A. except that 100 parts by weight of Colloidal Silica B was substituted for the 50 parts by weight of Colloidal Silica C.

E. This series of silicone emulsions was prepared by mixing the ingredients described in D. and adding 1.752 parts by weight diethylamine.

F. This series of silicone emulsions was prepared by mixing the ingredients defined in D. and adding 2.088 parts by weight morpholine.

Table IV shows the pH values for the silicone emulsions initially after preparation, after storage at room temperature for one day, three days, one week and two weeks as measured.

TABLE IV

| Series | X | pH, Initial | pH, 1 Day | pH, 3 Days | pH, 1 Week | pH, 2 Weeks |
|---|---|---|---|---|---|---|
| E | 0 | 11.0 | 11.1 | 11.3 | 11.4 | — |
| E | 0.3 | 11.2 | 11.3 | 11.4 | 11.4 | — |
| E | 1.5 | 11.5 | 11.5 | 11.4 | 11.4 | — |
| E | 3 | 11.8 | 11.5 | 11.7 | 11.4 | — |
| E | 6 | 12.3 | 11.6 | 11.9 | 11.4 | — |
| E | 9 | 12.8 | 11.7 | 12.0 | 11.4 | — |
| E | 12 | 13.4 | 12.0 | 12.0 | 11.4 | — |
| E | 15 | 13.5 | 12.0 | 12.2 | 11.6 | — |
| F | 0 | 9.6 | 9.9 | 9.9 | 9.8 | — |
| F | 0.3 | 9.9 | 10.0 | 10.0 | 10.0 | — |
| F | 1.5 | 10.6 | 10.8 | 10.7 | 10.6 | — |
| F | 3 | 11.9 | 11.3 | 11.2 | 11.0 | — |
| F | 6 | 12.5 | 11.8 | 11.6 | 11.4 | — |
| F | 9 | 12.5 | 11.8 | 11.6 | 11.4 | — |
| F | 12 | 12.8 | 11.9 | 11.7 | 11.5 | — |
| A | 1.5 | 9.4 | — | — | 9.8 | 10.1 |

TABLE IV-continued

| Series | X | pH, Initial | pH, 1 Day | pH, 3 Days | pH, 1 Week | pH, 2 Weeks |
|---|---|---|---|---|---|---|
| A | 3 | 10.6 | — | — | 10.6 | 10.6 |
| A | 6 | 11.2 | — | — | 11.2 | 11.2 |
| A | 9 | 12.0 | — | — | 11.9 | 11.2 |
| B | 0 | 10.7 | — | — | 10.7 | 10.8 |
| B | 0.3 | 11.3 | — | — | 11.3 | 11.3 |
| B | 1.5 | 11.7 | — | — | 11.5 | 11.5 |
| B | 3 | 11.9 | — | — | 11.6 | 11.6 |
| B | 6 | 12.5 | — | — | 11.9 | 11.6 |
| B | 9 | 13.1 | — | — | 12.0 | 11.7 |
| B | 12 | 13.5 | — | — | 12.5 | 11.7 |
| B | 15 | 13.5 | — | — | 12.5 | 11.7 |
| C | 0.3 | 11.0 | — | — | 10.6 | 10.5 |
| C | 1.5 | 11.9 | — | — | 11.5 | 11.3 |
| C | 3 | 12.9 | — | — | 12.4 | 12.1 |
| C | 9 | 13.6 | — | — | 13.0 | 12.2 |
| C | 12 | 14.0 | — | — | 13.4 | 12.4 |
| D | 0 | 7.7 | 8.2 | gelled | — | — |
| D | 0.3 | 8.6 | 9.0 | gelled | — | — |
| D | 1.5 | 10.1 | 10.4 | 10.4 | 10.4 | — |
| D | 3 | 11.2 | 11.0 | 11.0 | 11.0 | — |
| D | 6 | 12.5 | 11.4 | 11.4 | 11.6 | — |
| D | 9 | 13.0 | 11.6 | 11.6 | 11.6 | — |
| D | 12 | 13.5 | 11.8 | gelled | — | — |

EXAMPLE 10

A series of silicone emulsions was prepared using the ingredients defined in Example 9, E., except the parts by weight of the sodium hydroxide solution were as defined in Table V. These emulsions were then stored at 50° C. Films were cast using these emulsions after different periods of storage and the water was allowed to evaporate at room temperature to provide a cured elastomer. The elongation of these cured elastomeric films were determined. The results were as shown in Table V.

TABLE V

| Parts by Weight NaOH Solution | Initial | Elongation % 3 days storage | 1 week storage | 2 weeks storage | 4 weeks storage |
|---|---|---|---|---|---|
| 0 | 700 | 700 | 650 | 550 | 330 |
| 3.0 | 517 | 508 | 525 | 458 | 350 |
| 4.0 | 758 | 792 | 608 | 642 | 608 |
| 5.0 | 608 | 525 | 633 | 655 | 608 |
| 6.0 | 625 | 633 | 583 | 637 | 433 |

That which is claimed is:

1. A silicone emulsion suitable to provide an elastomeric product upon removal of the water under ambient conditions comprising a continuous aqueous phase and a dispersed phase, the dispersed phase consists essentially of an anionically stabilized hydroxylated polydiorganosiloxane which contains about 2 silicon-bonded hydroxyls per molecule an organic tin compound and a colloidal silica, said silicone emulsion having a pH in a range of 9 to 11.5 inclusive.

2. The silicone emulsion according to claim 1 in which the polydiorganosiloxane is a polydimethylsiloxane.

3. The silicone emulsion according to claim 2 in which there is present for each 100 parts by weight polydimethylsiloxane from 1 to 150 parts by weight colloidal silica.

4. The silicone emulsion according to claim 3 in which the polydimethylsiloxane has a weight average molecular weight in a range of 200,000 to 700,000 and the colloidal silica has a particle diameter of 0.0001 to 0.1 micrometers.

5. The silicone emulsion according to claim 3 in which the organic tin compound is a diorganotindicarboxylate and is present in an amount of from 0.1 to 2 parts by weight for each 100 parts by weight polydiorganosiloxane.

6. The silicone emulsion according to claim 4 in which the organic tin compound is a diorganotindicarboxylate and is present in an amount of from 0.1 to 2 parts by weight for each 100 parts by weight polydiorganosiloxane.

7. The silicone emulsion according to claim 5 in which there is also present an organic amine composed of carbon, hydrogen and nitrogen atoms or carbon, hydrogen, nitrogen and oxygen atoms, said organic amine being soluble in the amount of water present in the emulsion, and said organic amine being present in an amount such that the pH limits are not violated.

8. The silicone emulsion according to claim 6 in which there is also present an organic amine composed of carbon, hydrogen and nitrogen or carbon, hydrogen, nitrogen and oxygen, said organic amine being soluble in the amount of water present in the emulsion, and said organic amine being present in an amount such that the pH limits are not violated.

9. The silicone emulsion according to claim 8 in which the organic amine is present in an amount less than 5 parts by weight for each 100 parts by weight polydimethylsiloxane.

10. The silicone emulsion according to claim 9 in which the organic amine is diethylamine.

11. The silicone emulsion according to claim 1 in which the emulsion contains sodium ion derived from sodium stabilized colloidal silica.

12. The silicone emulsion according to claim 11 in which additional sodium ion is derived from sodium hyroxide.

13. The silicone emulsion according to claim 5 in which the emulsion contains sodium ion derived from sodium stabilized colloidal silica.

14. The silicone emulsion according to claim 13 in which additional sodium ion is derived from sodium hydroxide.

15. The silicone emulsion according to claim 6 in which the emulsion contains sodium ion derived from sodium stabilized colloidal silica.

16. The silicone emulsion according to claim 15 in which additional sodium ion is derived from sodium hydroxide.

17. The silicone emulsion according to claim 10 in which the emulsion contains sodium ion derived from sodium stabilized colloidal silica.

18. The silicone emulsion according to claim 17 in which additional sodium ion is derived from sodium hydroxide.

19. The silicone emulsion according to claim 5 in which there is also present a thickener.

20. The silicone emulsion according to claim 6 in which there is also present a thickener.

21. The silicone emulsion according to claim 20 in which there is also present a filler other than colloidal silica.

22. The silicone emulsion according to claim 21 in which the filler other than colloidal silica is titanium dioxide.

23. The silicone emulsion in accordance with claim 5 in which there is also present an antifoam.

24. The silicone emulsion in accordance with claim 20 in which there is also present an antifoam.

25. The silicone emulsion according to claim 22 in which there is also present an antifoam.

26. The silicone emulsion in accordance with claim 1 in which the hydroxylated polydiorganosiloxane is an anionic emulsion polymerized hydroxylated polydiorganosiloxane.

27. The silicone emulsion according to claim 5 in which the hydroxylated polydimethylsiloxane is an anionic emulsion polymerized polydimethylsiloxane.

28. The silicone emulsion according to claim 6 in which the hydroxylated polydimethylsiloxane is an anionic emulsion polymerized polydimethylsiloxane.

29. The silicone emulsion according to claim 11 in which the hydroxylated polydiorganosiloxane is an anionic emulsion polymerized polydiorganosiloxane.

30. The silicone emulsion according to claim 16 in which the hydroxylated polydimethylsiloxane is an anionic emulsion polymerized polydimethylsiloxane and there is also present a thickener, an antifoam and titanium dioxide.

31. A method of preparing a silicone emulsion suitable to provide an elastomeric product upon removal of the water under ambient conditions consisting essentially
    (I) emulsifying a hydroxylated polydiroganosiloxane which contains about 2 silicon-bonded hydroxyls per molecule using anionic surfactant and water,
    (II) adding a colloidal silica and an organic tin compound, and
    (III) adjusting the pH of the resulting emulsion within the range from 9 to 11.5 inclusive.

32. The method in accordance with claim 31 in which (I) is obtained by preparing an emulsion of a hydroxylated polydiorganosiloxane by anionically emulsion polymerization of a siloxane selected from the group consisting of polydiorganosiloxane cyclics, hydroxyl endblocked polydiorganosiloxanes having a viscosity no greater than 0.2 Pa.s at 25° C. and mixtures thereof, and in (II) adding to the polydiorganosiloxane, a colloidal silica which is in the form of a sodium ion stabilized aqueous dispersion of colloidal silica, and thereafter adding a diorganotindicarboxylate and in (III), the pH is adjusted within the defined range by using an organic amine composed of carbon, hydrogen and nitrogen atoms or carbon, hydrogen, nitrogen and oxygen atoms, said organic amine being soluble in the amount of water present in the emulsion, and said organic amine being present in an amount such that the pH limits are not violated.

33. The method in accordance with claim 32 in which there is present 1 to 150 parts by weight colloidal silica for each 100 parts by weight of hydroxylated polydiorganosiloxane, from 0.1 to 2 parts by weight diorganotindicarboxylate for each 100 parts by weight of hydroxylated polydiorganosiloxane, the organic amine is diethylamine, and there is also added a thickener, an antifoam and a filler other than colloidal silica.

34. A method of preparing a silicone emulsion suitable to provide an elastomeric product upon removal of the water under ambient conditions consisting essentially of
    (I) emulsifying a hydroxylated polydiorganosiloxane which contains about 2 silicon-bonded hydroxyls per molecule using anionic surfactant and water,
    (II) adding a colloidal silica and an organic tin compound, and thereafter,
    (III) adjusting the pH of the resulting emulsion to a value greater than 11.5.

35. A silicone emulsion prepared by the method of claim 34.

* * * * *

UNITED STATES PATENT AND TRADEMARK OFFICE
CERTIFICATE OF CORRECTION

PATENT NO. : 4,221,688
DATED : September 9, 1980
INVENTOR(S) : Robert D. Johnson, et al It is certified that error appears in the above—identified patent and that said Letters Patent is hereby corrected as shown below:

In Column 2, line 26; the line reading "con polymer in water using a suitable dispersing agent." should read "cone polymer in water using a suitable dispersing agent."

In Column 9, line 3; the line reading "required as state above. To obtain the preferred pH" should read "required as stated above. To obtain the preferred pH"

In Column 12, line 49; Under Table I the column reading "Mw" should read "$\bar{M}w$"

In Column 12, line 68; the line reading "a strong acid ion exchange resin untl the pH reached the" should read "a strong acid ion exchange resin until the pH reached the"

Signed and Sealed this

Twenty-ninth Day of June 1982

[SEAL]

Attest:

GERALD J. MOSSINGHOFF

Attesting Officer    Commissioner of Patents and Trademarks